United States Patent
Wu

(10) Patent No.: US 8,782,298 B2
(45) Date of Patent: Jul. 15, 2014

(54) COMPUTING DEVICE AND METHOD FOR ADJUSTING PHYSICAL LINKS OF A SAS EXPANDER OF THE COMPUTING DEVICE

(71) Applicant: Hon Hai Precision Industry Co., LTD., New Taipei (TW)

(72) Inventor: Chih-Huang Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/691,907

(22) Filed: Dec. 3, 2012

(65) Prior Publication Data

US 2013/0159558 A1     Jun. 20, 2013

(30) Foreign Application Priority Data

Dec. 15, 2011   (TW) .................................. 100146644

(51) Int. Cl.
*G06F 3/00*     (2006.01)
*G06F 15/173*   (2006.01)
*G06F 15/177*   (2006.01)

(52) U.S. Cl.
USPC .......... 710/9; 710/8; 710/15; 710/18; 710/19; 709/221; 709/225; 709/226; 713/1; 713/2; 713/100

(58) Field of Classification Search
None
See application file for complete search history.

(56) References Cited

U.S. PATENT DOCUMENTS

| | | | |
|---|---|---|---|
| 7,035,952 B2 * | 4/2006 | Elliott et al. | 710/300 |
| 7,584,319 B1 * | 9/2009 | Liao et al. | 710/317 |
| 8,255,607 B2 * | 8/2012 | Jones et al. | 710/316 |
| 8,582,462 B2 * | 11/2013 | Sharma et al. | 370/252 |
| 2013/0151886 A1 * | 6/2013 | Wu | 714/5.1 |

* cited by examiner

*Primary Examiner* — Henry Tsai
*Assistant Examiner* — Michael Sun
(74) *Attorney, Agent, or Firm* — Novak Druce Connolly Bove + Quigg LLP

(57) ABSTRACT

A method to adjust physical links of serial attached small computer system interface (SAS) expanders of a computing device. The SAS expanders include a first SAS expander and one or more second SAS expanders. When data flow of the physical links of the first SAS expander for transmitting data to a second SAS expander is saturated, the method determines whether the first SAS expander has reserved physical links that can be adjusted. If the first SAS expander has reserved physical links that can be adjusted, the method generates a new firmware, and adjusts the adjusted physical link to the second SAS expander by writing the new firmware to the first SAS expander. The method also adjusts the adjusted physical link to the second SAS expander on hardware circuit.

18 Claims, 5 Drawing Sheets

COMPUTING DEVICE AND METHOD FOR ADJUSTING PHYSICAL LINKS OF A SAS EXPANDER OF THE COMPUTING DEVICE

BACKGROUND

1. Technical Field

Embodiments of the present disclosure relate to a serial attached small computer system interface (SAS) expander adjusting systems and methods, and particularly to a computing device and method for adjusting physical links of a SAS expander of the computing device.

2. Description of Related Art

When physical links of a SAS expander of a computing device are determined by firmware of the SAS expander, the physical links cannot be adjusted after manufacturing. If the data flow of a physical link is saturated, other physical links of the SAS expander may not be able to alleviate the data flow. Transmission speed of the SAS expander may be affected. Therefore, there is need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage system. Some non-limiting examples of non-transitory computer-readable medium include CDs, DVDs, BLU-RAY, flash memory, and hard disk drives.

Figure 1:
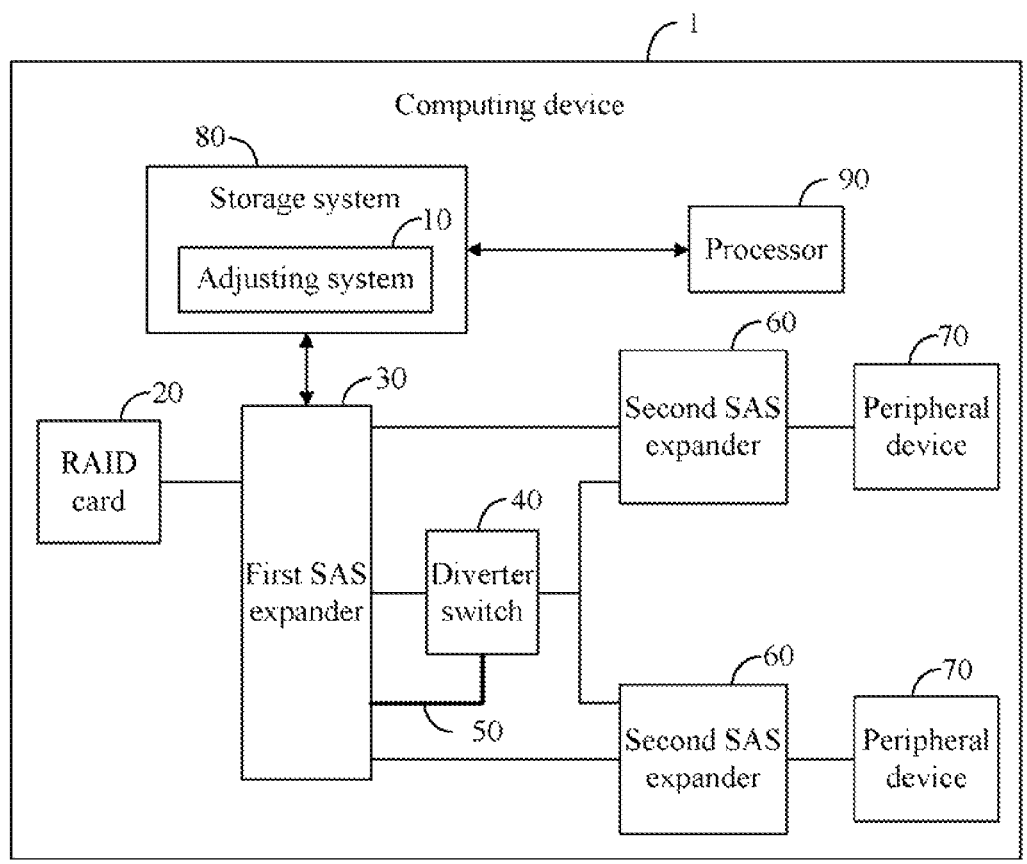
FIG. 1 is a block diagram of one embodiment of a computing device including an adjusting system.

FIG. 1 is a block diagram of one embodiment of a computing device 1 including an adjusting system 10. In the embodiment, the computing device 1 further includes a redundant array of independent disks (RAID) card 20, a first serial attached small computer system interface (SAS) expander 30, a diverter switch 40, a system management bus (SMBus) 50, one or more second SAS expanders 60 (only two shown in FIG. 1), and one or more peripheral devices 70 (only two shown in FIG. 1), a storage system 80, and at least one processor 90. The at least one processor 90 executes one or more computerized codes and other applications of the computing device 1, to provide functions of the adjusting system 10. The adjusting system 10 may determine whether data flow of one or more physical links of the first SAS expander 30 is saturated, and automatically adjust one or more reserved physical links of the first SAS expander 30 to alleviate the data flow of the physical links that is saturated.

The RAID card 20 is connected to the first SAS expander 30 through an SAS port (not shown in FIG. 1). The first SAS expander 30 is connected to one or more second SAS expanders 60 through one or more SAS ports (not shown in FIG. 1). Each of the second SAS expanders 60 is electronically connected to one of the peripheral devices 70. The peripheral device 70 may be a hard disk drive (HDD), another SAS expander, and a SAS host bus adapter (HBA), for example. If the peripheral device 70 is an SAS expander, the peripheral device 70 may be electronically connected to other attached peripheral devices. The first SAS expander 30 is an upper level SAS expander of the computing device 1, and the second SAS expander 60 is a lower level SAS expander of the computing device 1.

The SMBus 50 includes a bidirectional data line and a clock line, and is used to transmit control signals through the bidirectional data line and the clock line. The control signals are generated by the first SAS expander 30. The SMBus 50 is electronically connected to the first SAS expander 30 and the diverter switch 40. The first SAS expander 30 transmits the control signals to the diverter switch 40 through the SMBus 50. The diverter switch 40 is used to adjust one or more reserved physical links of the first SAS expander 30 to share the data flow of the physical links of the first SAS expander 30 according to the control signals when the data flow of the physical links is saturated. The diverter switch 40 is electronically connected to the first SAS expander 30 and each of the second SAS expanders 60.

Figure 4:
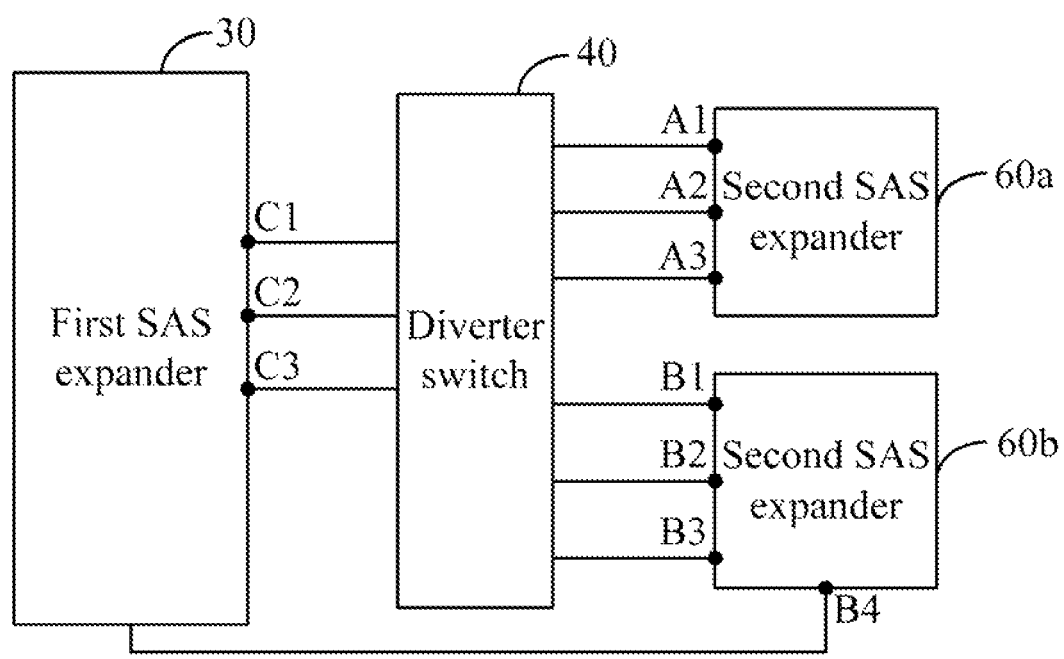
FIG. 4 is an example of connections of the physical links in FIG. 1.

In one embodiment, signal lines of the diverter switch 40 that connect to the first SAS expander 30 and the second SAS expanders 60 are determined by the amount of the physical links of the first SAS expander 30. As shown in FIG. 4, the first SAS expander 30 has three physical links, the diverter switch 40 connects to the first SAS expander 30, a second SAS expander 60a and a second SAS expander 60b through three signal lines respectively.

The adjusting system 10 is stored in the storage system 80. The storage system 80 also stores data of the computing device 1. The storage system 80 may be an internal storage system, such as a random access memory (RAM) for temporary storage of information, and/or a read-only memory (ROM) for permanent storage of information. In some embodiments, the storage system 80 may also be an external storage system, such as an external hard disk, a storage card, or a data storage medium.

In one embodiment, the physical links are a set of four wires used as two differential signal pairs. One differential signal transmits in one direction, while the other differential signal transmits in the opposite direction. Data can be transmitted through the physical links in both directions simultaneously. The physical links are contained in SAS ports which contain one or more fixed physical links and reserved physical links. Each physical link has an identification number. Each fixed physical link corresponds to one or more reserved physical links. The fixed physical links and the reserved physical links correspond to the fixed physical links are defined by hardware circuit of the first SAS expander 30, and stored in the firmware of the first SAS expander 30. The fixed physical links cannot be adjusted, and the reserved physical links are adjusted when the data flow of the first SAS expander 30 is saturated.

The first SAS expander 30 includes a flash memory (not shown in FIG. 1) to store a firmware of the first SAS expander 30. The firmware is embedded in the first SAS expander 30 and makes functions of the first SAS expander 30 work normally, and the firmware can be updated or upgraded. The firmware may accommodate, but is not limited to, configuration parameters of the first SAS expander 30, such as, configuration data of the physical links of the first SAS expander 30, address information of the first SAS expander 30, and connection data of the physical links of the first SAS expander 30, for example. The storage system 80 stores a file having an original firmware of the first SAS expander 30 of the computing device 1, where the original firmware controls the first SAS expander 30 to work normally.

Figure 2:
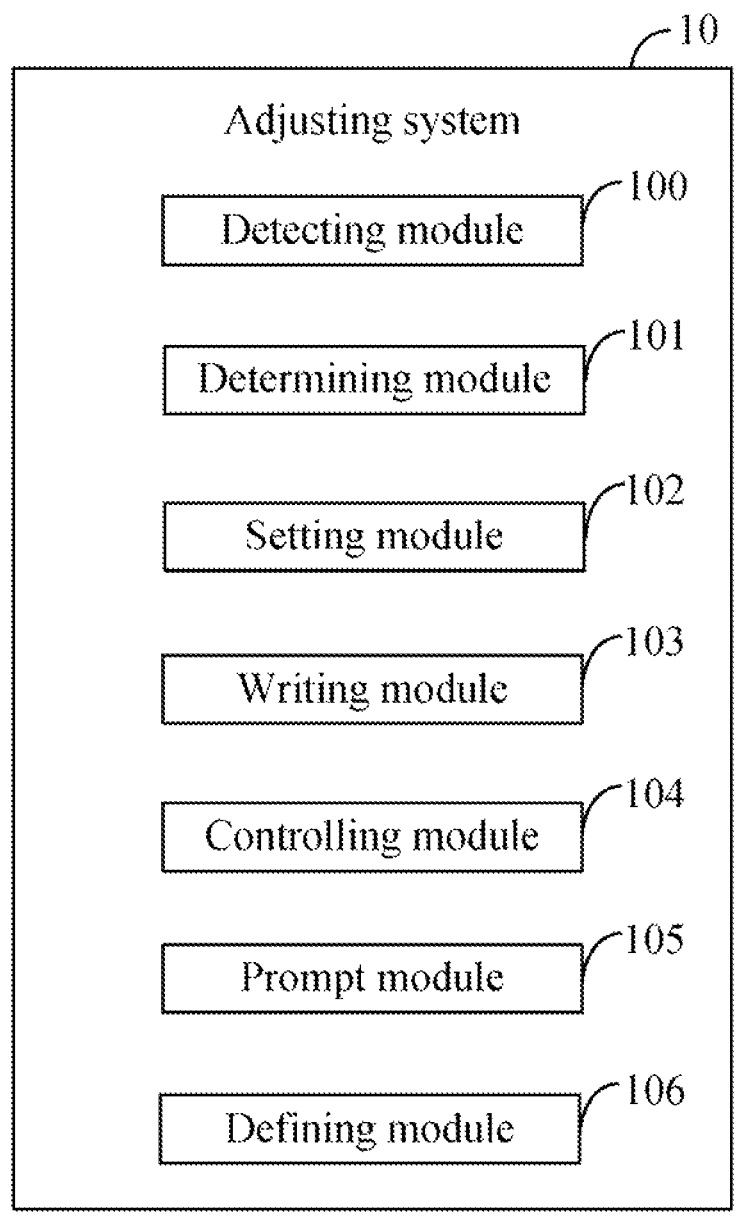
FIG. 2 is a block diagram of function modules of the adjusting system included in the computing device of FIG. 1.

FIG. 2 is a block diagram of function modules of the adjusting system 10 included in the computing device 1 of FIG. 1. In the embodiment, the adjusting system 10 may include one or more modules, for example, a detecting module 100, a determining module 101, a setting module 102, a writing module 103, a controlling module 104, a prompt module 105 and a defining module 106. The one or more modules 100-106 may comprise computerized code in the form of one or more programs that are stored in the storage system 80 of the computing device 1. The computerized code includes instructions that are executed by the at least one processor 90 to provide functions for the one or more modules 100-106. A detailed description of each module will be given in the following paragraphs.

Figure 3:
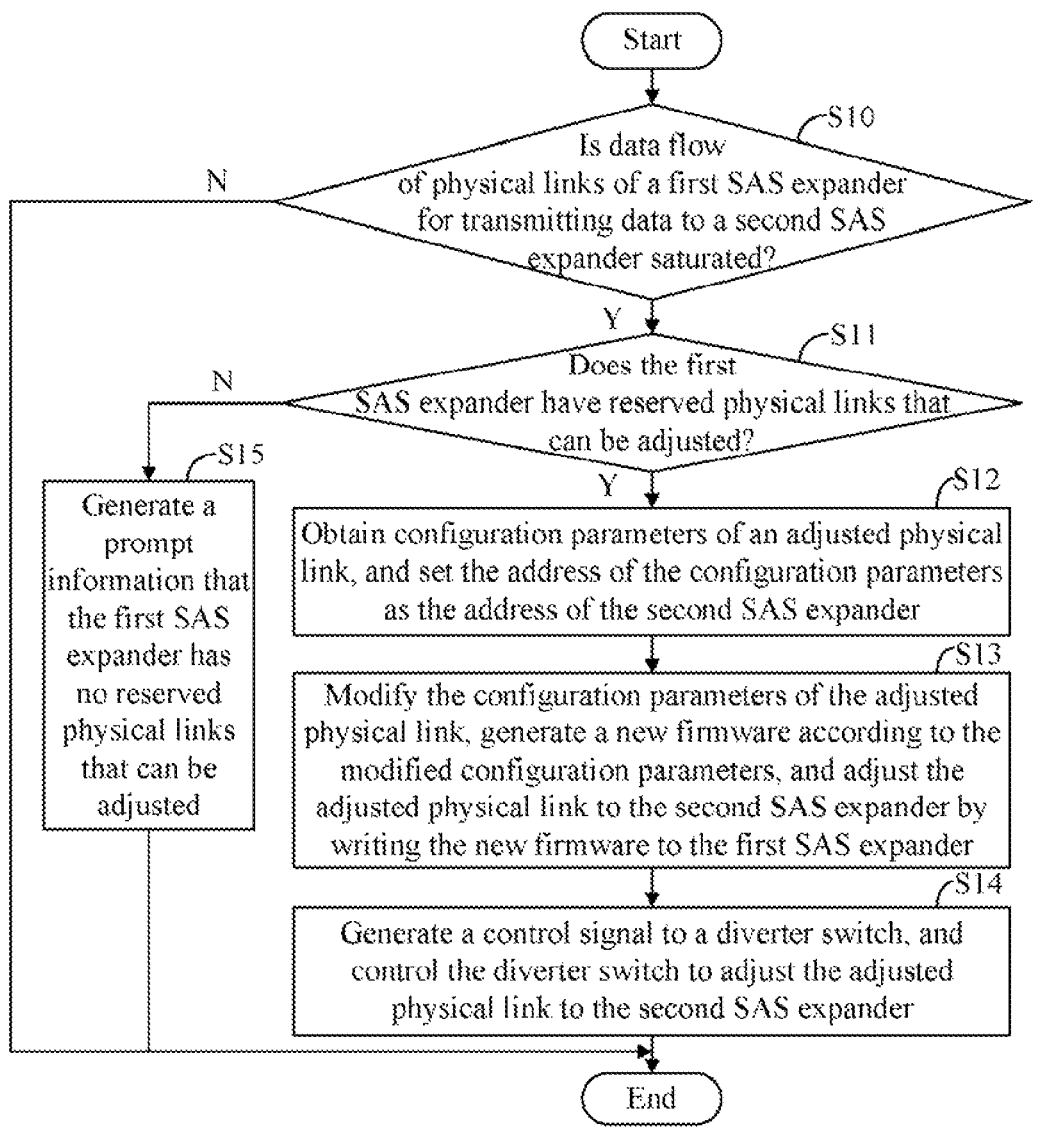
FIG. 3 is a flowchart of one embodiment of a method for automatically adjusting physical links of a SAS expander using the computing device of FIG. 1.

FIG. 3 is a flowchart of one embodiment of a method for automatically adjusting physical links of the first SAS expander 30 using the computing device 1. Depending on the embodiment, additional steps may be added, others removed, and the ordering of the steps may be changed.

In step S10, the detecting module 100 detects whether the data flow of the physical links of the first SAS expander 30 is saturated. The physical links are used for transmitting data to the second SAS expanders 60, and hereinafter the physical links for transmitting data to the second SAS expanders 60 are referred to as the transmitted physical links. If the data flow of the transmitted physical links of the first SAS expander 30 is saturated, step S11 is implemented. If the data flow of the transmitted physical links of the first SAS expander 30 is not saturated, the procedure ends.

In one embodiment, the transmitted physical links of the first SAS expander 30 include fixed physical links and reserved physical links. The data flow of each of the transmitted physical links is equal when the transmitted physical links transmit data to the same second SAS expander 60. Referring to FIG. 4, if the first SAS expander 30 has two fixed physical links with the identification numbers 10 and 11 for transmitting data to the second SAS expander 60a, the data flow of the fixed physical links with the identification number 10 is equal to the data flow of the fixed physical links with the identification number 11.

Because the first SAS expander 30 may connect to more than one second SAS expanders 60, the first SAS expander 30 has more than one physical links to transmit data to the more than one second SAS expanders 60. It is difficult to detect which physical links transmit data to which second SAS expander 60. Each of the second SAS expanders 60 has physical links to receive data from the first SAS expander 30. The data flow of the physical links of each of the second SAS expanders 60 is equal to the data flow of the transmitted physical links of the first SAS expander 30 that connects to the second SAS expander 60. Hereinafter, the physical links for receiving data from the first SAS expander 30 are referred to as the received physical links. In order to reduce the difficulty of detecting, the detecting module detects the data flow of the received physical links of the second SAS expander 60.

In some embodiments, if the data flow of the received physical links of the second SAS expander 60 is less than a predefined threshold, the detecting module 100 determines that the data flow of the transmitted physical links of the first SAS expander 30 is not saturated. If the data flow of the received physical links of the second SAS expander 60 is not less than the predefined threshold, the detecting module 100 determines that the data flow of the transmitted physical links of the first SAS expander 30 is saturated. The predefined threshold is user-determined or pre-determined according to the amount of the received physical links and the maximum data flow of each of the received physical links. For example, the second SAS expander 60 has two received physical links, and the maximum data flow of each of the received physical links is 3 Gbps, then the predefined threshold may be defined as 95% of 6 Gbps, namely 5.7 Gpbs. The 95% is user-determined or pre-determined, also may be a value between 90% and 99%, for example.

In step S11, the determining module 101 determines whether the first SAS expander 30 has reserved physical links that can be adjusted. If the first SAS expander 30 has reserved physical links that can be adjusted, the determining module 101 determines a reserved physical link to be adjusted, and step S12 is implemented. If the first SAS expander 30 has no reserved physical links that can be adjusted, step S15 is implemented. A detailed description of step S11 will be given in FIG. 5.

In step S12, the setting module 102 obtains configuration parameters of the adjusted physical link, and sets the address of the configuration parameters as the address of the second SAS expander 60. In one embodiment, the setting module 106 obtains configuration parameters of the adjusted physical link from the firmware of the first SAS expander 30, further obtains address information of the adjusted physical link from the configuration parameters, and sets the address information as the address of a SAS port of the second SAS expander 60.

In step S13, the writing module 103 modifies the configuration parameters of the adjusted physical link according to the hardware circuit of the first SAS expander 30, generates a new firmware according to the modified configuration parameters, and adjusts the adjusted physical link to the second SAS expander 60 by writing the new firmware to the first SAS expander 30. The new firmware includes the modified configuration parameters, the original firmware of the first SAS expander 30.

The first SAS expander 30 can only store one firmware. In one embodiment, after the new firmware is written into the first SAS expander 30, the firmware stored in the first SAS expander 30 is replaced by the new firmware. After the new firmware is written into the first SAS expander 30, the adjusting of the adjusted physical link is finished, but the hardware circuit of the adjusted physical link does not change.

In step S14, the controlling module 104 generates a control signal to the diverter switch 40, and controls the diverter switch to adjust the adjusted physical link to the second SAS expander 60 according to the control signal. In one embodiment, the diverter switch 40 has different connectivity options, and each of the connectivity options adjusts a connectivity of the adjusted physical link according to the control signal.

In one embodiment, the defining module 106 allocates the adjusted physical link to the second SAS expander 60 using each of the different connectivity options. When the diverter switch 40 receives the control signal, the diverter switch 40 adjusts the connectivity option of the adjusted physical link according to the control signal, and then the adjustment of the adjusted physical link on the hardware circuit is finished.

In step S15, the prompt module 105 generates a prompt information that the first SAS expander 30 does not include reserved physical links that can be adjusted. The prompt information may include the data flow of the reserved physical links, and the second SAS expander 60 that uses the reserved physical links, for example.

Figure 5:
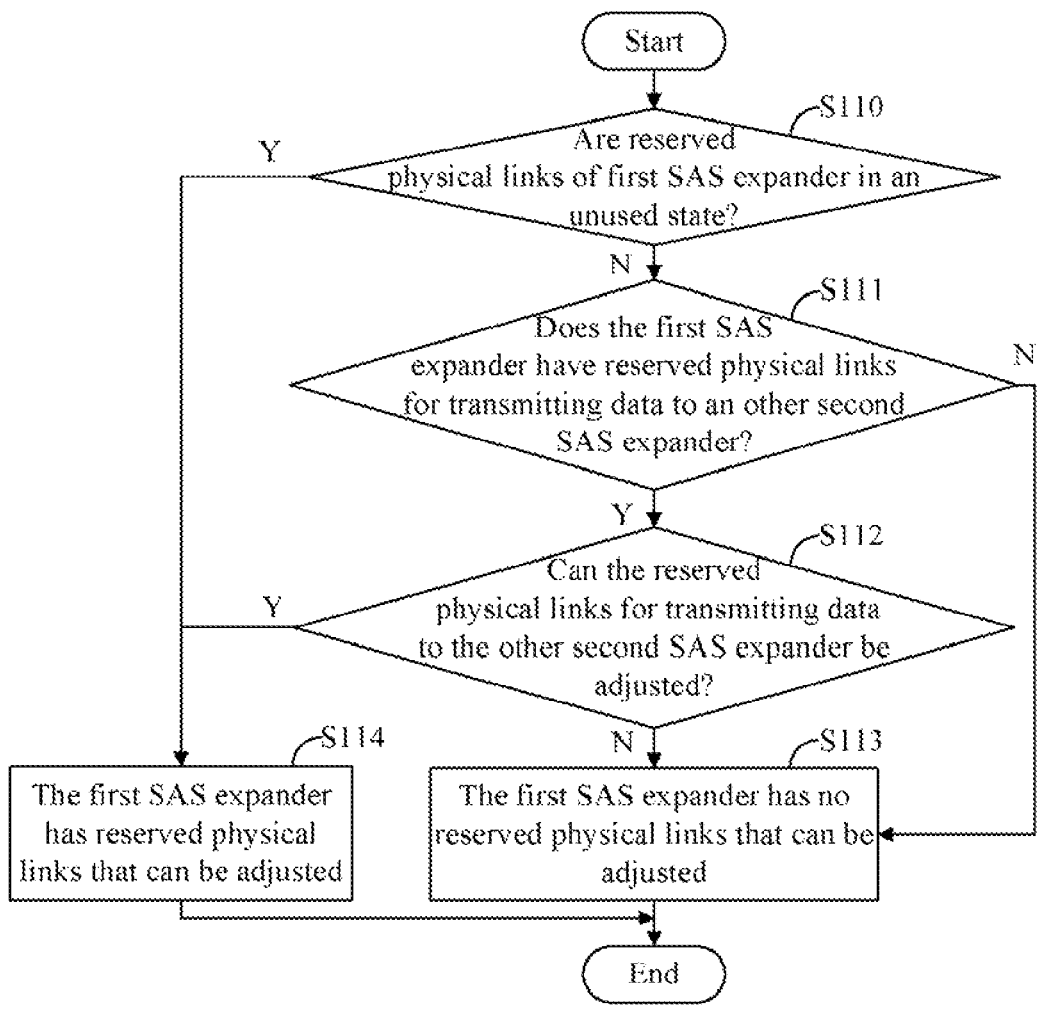
FIG. 5 is a detailed flowchart of step S11 in FIG. 3.

FIG. 5 is a detailed flowchart of step S11 in FIG. 3. Depending on the embodiment, additional steps may be added, others removed, and the ordering of the steps may be changed.

In step S110, the determining module 101 determines whether the reserved physical links of the first SAS expander 30 are in an unused state. If the reserved physical links of the first SAS expander 30 are in the unused state, the determining module 101 determines a reserved physical link in the unused state to be the adjusted physical link, and step S114 is implemented. If the reserved physical links of the first SAS expander 30 are not in the unused state, step S111 is implemented.

In one embodiment, the reserved physical links may be in a use state or in an unused state. If the reserved physical links of the first SAS expander 30 is connected to the second SAS expanders 60, the reserved physical links are in the use state. If the reserved physical links of the first SAS expander 30 is not connected to the second SAS expanders 60, the reserved physical links are in the unused state. Referring to FIG. 4, the first SAS expander 30 has three reserved physical links corresponding to three SAS ports C1, C2 and C3, the second SAS expander 60a has three SAS ports A1, A2 and A3, and the second SAS expander 60b has three SAS ports B1, B2 and B3. For example, if the SAS port C1 is connected to SAS ports B1, the reserved physical link corresponding to SAS port C1 is in the use state. If the SAS port C1 is not connected to the second SAS expander 60a and the second SAS expander 60b, the reserved physical link corresponding to SAS port C1 is in the unused state.

In step S111, the determining module 101 determines whether the first SAS expander 30 has reserved physical links for transmitting data to an other second SAS expander 60, where the other second SAS expander 60 is a SAS expander that excepts a second SAS expander 60 having the saturated transmitted physical links. Hereinafter, the reserved physical links for transmitting data to the other second SAS expander 60 are referred to as reserved transmitted physical links. If the first SAS expander 30 includes the reserved transmitted physical links, step S112 is implemented. If the first SAS expander 30 does not include reserved transmitted physical links, step S113 is implemented.

Referring to FIG. 4, if SAS ports C1 and C2 connect to the second SAS expander 60a, and the data flow of the physical links corresponding to the SAS ports C1 and C2 is saturated, the determining module 101 determines whether the first SAS expander 30 includes reserved physical links for transmitting data to the second SAS expander 60b.

In step S112, the determining module 101 determines whether reserved transmitted physical links can be adjusted. If the reserved transmitted physical links cannot be adjusted, step S113 is implemented. If the reserved transmitted physical links can be adjusted, the determining module 101 determines a reserved transmitted physical link that can be adjusted to be the adjusted physical link, and step S114 is implemented.

In one embodiment, if the data flow of the received physical links of the other second SAS expander 60 is less than a default value, the determining module 101 determines that the reserved transmitted physical links can be adjusted. If the data flow of the received physical links of the other second SAS expander 60 is not less than the default value, the determining module 101 determines that the reserved transmitted physical links cannot be adjusted. The default value is set according to the maximum data flow of the received physical links and the proportion of the reserved physical links in the received physical links. For example, if the maximum data flow of the received physical links are 6 Gbps and the proportion of the reserved physical links in the received physical links is 50%, the default value may be 45% of 6 Gbps, namely 2.7 Gpbs. The 45% is user-determined or pre-determined, also may be a value between 40% and 49%, for example.

In step S113, the determining module 101 determines that the first SAS expander 30 has no reserved physical links that can be adjusted.

In step S114, the determining module 101 determines that the first SAS expander 30 has reserved physical links that can be adjusted.

In the present disclosure, when the data flow of the physical link of the first SAS expander 30 is saturated, the reserved physical links can be adjusted to alleviate the data flow automatically. Thus, transmission speed of the first SAS expander 30 will not be affected.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for adjusting physical links of serial attached small computer system interface (SAS) expanders of a computing device, the SAS expanders comprising a first SAS expander and one or more second SAS expanders, the method comprising:
    (a) detecting whether data flow of physical links of the first SAS expander for transmitting data to a second SAS expander connected to the first SAS expander is saturated;
    (b) determining whether the first SAS expander has reserved physical links that can be adjusted when the data flow of the physical links of the first SAS expander for transmitting data to the second SAS expander is saturated;
    (c) determining a reserved physical link to be adjusted from the reserved physical links, obtaining configuration parameters of the adjusted physical link, and setting address information of the configuration parameters as an address of the second SAS expander when the first SAS expander has reserved physical links that can be adjusted;
    (d) modifying the configuration parameters of the adjusted physical link, generating a new firmware according to the modified configuration parameters, and adjusting the adjusted physical link to the second SAS expander by writing the new firmware to the first SAS expander; and
    (e) generating a control signal to a diverter switch that connects to the SAS first expander and the second SAS expander, and controlling the diverter switch to adjust the adjusted physical link to the second SAS expander according to the control signal.

2. The method according to claim 1, wherein step (a) comprises:

determining that the data flow of the physical links of the first SAS expander for transmitting data to the second SAS expander is saturated when the data flow of physical links of the second SAS expander for receiving data from the first SAS expander is not less than a predefined threshold; and determining that the data flow of the physical links of the first SAS expander for transmitting data to the second SAS expander is not saturated when the data flow of the physical links of the second SAS expander for receiving data from the first SAS expander is less than the predefined threshold.

3. The method according to claim 1, wherein step (b) comprises:

determining whether the reserved physical links of the first SAS expander are in an unused state;

determining whether the first SAS expander has reserved physical links for transmitting data to an other second SAS expander when the reserved physical links of the first SAS expander are not in the unused state;

determining whether the data flow of the reserved physical links of the other second SAS expander is less than a default value when the first SAS expander has reserved physical links for transmitting data to the other second SAS expander;

determining that the first SAS expander has no reserved physical links that can be adjusted when the first SAS expander has no reserved physical links for transmitting data to the other second SAS expander, or the data flow of the reserved physical links of the other second SAS expander is not less than the default value; and determining that the first SAS expander has reserved physical links that can be adjusted when the reserved physical links of the first SAS expander are in the unused state, or the data flow of the reserved physical links of the other second SAS expander is less than the default value.

4. The method according to claim 1, wherein step (c) comprises:

obtaining configuration parameters of the adjusted physical link from the firmware of the first SAS expander;

obtaining address information of the adjusted physical link from the configuration parameters; and setting the address information as an address of a SAS port of the second SAS expander.

5. The method according to claim 1, wherein the diverter switch has different connectivity options, and each of the connectivity options adjusts a connectivity of the adjusted physical link according to the control signal.

6. The method according to claim 5, further comprising:

allocating the adjusted physical link to the second SAS expander using each of the different connectivity options.

7. A computing device, comprising:

a first serial attached small computer system interface (SAS) expander and one or more second SAS expanders;

a storage system;

at least one processor; and one or more modules that are stored in the storage system and are executed by the at least one processor, the one or more modules comprising:

a detecting module that detects whether data flow of physical links of the first SAS expander for transmitting data to a second SAS expander connected to the first SAS expander is saturated;

a determining module that determines whether the first SAS expander has reserved physical links that can be adjusted when the data flow of the physical links of the first SAS expander for transmitting data to the second SAS expander is saturated;

a setting module that determines a reserved physical link to be adjusted from the reserved physical links, obtains configuration parameters of the adjusted physical link, and sets address information of the configuration parameters as an address of the second SAS expander when the first SAS expander has reserved physical links that can be adjusted;

a writing module that modifies the configuration parameters of the adjusted physical link, generates a new firmware according to the modified configuration parameters, and adjusts the adjusted physical link to the second SAS expander by writing the new firmware to the first SAS expander; and a controlling module that generates a control signal to a diverter switch that connects to the SAS first expander and the second SAS expander, and controls the diverter switch to adjust the adjusted physical link to the second SAS expander according to the control signal.

8. The computing device according to claim 7, wherein the detecting module further:

determines that the data flow of the physical links of the first SAS expander for transmitting data to the second SAS expander is saturated when the data flow of physical links of the second SAS expander for receiving data from the first SAS expander is not less than a predefined threshold; and determines that the data flow of the physical links of the first SAS expander for transmitting data to the second SAS expander is not saturated when the data flows of the physical links of the second SAS expander for receiving data from the first SAS expander is less than the predefined threshold.

9. The computing device according to claim 7, wherein the determining module further:

determines whether the reserved physical links of the first SAS expander are in an unused state;

determines whether the first SAS expander has reserved physical links for transmitting data to an other second SAS expander when the reserved physical links of the first SAS expander are not in the unused state;

determines whether the data flows of the reserved physical links of the other second SAS expander are less than a default value when the first SAS expander has reserved physical links for transmitting data to the other second SAS expander;

determines that the first SAS expander has no reserved physical links that can be adjusted when the first SAS expander has no reserved physical links for transmitting data to the other second SAS expander, or the data flow of the reserved physical links of the other second SAS expander is not less than the default value; and determines that the first SAS expander has reserved physical links that can be adjusted when the reserved physical links of the first SAS expander are in the unused state, or the data flow of the reserved physical links of the other second SAS expander is less than the default value.

10. The computing device according to claim 7, wherein the setting module further:

obtains configuration parameters of the adjusted physical link from the firmware of the first SAS expander;

obtains address information of the adjusted physical link from the configuration parameters; and sets the address information as an address of a SAS port of the second SAS expander.

11. The computing device according to claim 7, wherein the diverter switch has different connectivity options, and each of the connectivity options adjusts a connectivity of the adjusted physical link according to the control signal.

12. The computing device according to claim 11, the one or more modules further comprising:
a defining module that allocates the adjusted physical link to the second SAS expander using each of the different connectivity options.

13. A non-transitory storage medium having stored thereon instructions that, when executed by a processor of a computing device, causes the computing device to perform a method for adjusting physical links of serial attached small computer system interface (SAS) expanders of the computing device, the SAS expanders comprising a first SAS expander and one or more second SAS expanders, the method comprising:
(a) detecting whether data flow of physical links of the first SAS expander for transmitting data to a second SAS expander connected to the first SAS expander is saturated;
(b) determining whether the first SAS expander has reserved physical links that can be adjusted when the data flow of the physical links of the first SAS expander for transmitting data to the second SAS expander is saturated;
(c) determining a reserved physical link to be adjusted from the reserved physical links, obtaining configuration parameters of the adjusted physical link, and setting address information of the configuration parameters as an address of the second SAS expander when the first SAS expander has reserved physical links that can be adjusted;
(d) modifying the configuration parameters of the adjusted physical link, generating a new firmware according to the modified configuration parameters, and adjusting the adjusted physical link to the second SAS expander by writing the new firmware to the first SAS expander; and
(e) generating a control signal to a diverter switch that connects to the SAS first expander and the second SAS expander, and controlling the diverter switch to adjust the adjusted physical link to the second SAS expander according to the control signal.

14. The non-transitory storage medium according to claim 13, wherein step (a) comprises:
determining that the data flow of the physical links of the first SAS expander for transmitting data to the second SAS expander is saturated when the data flow of physical links of the second SAS expander for receiving data from the first SAS expander is not less than a predefined threshold; and
determining that the data flow of the physical links of the first SAS expander for transmitting data to the second SAS expander is not saturated when the data flow of the physical links of the second SAS expander for receiving data from the first SAS expander is less than the predefined threshold.

15. The non-transitory storage medium according to claim 13, wherein step (b) comprises:
determining whether the reserved physical links of the first SAS expander are in an unused state;
determining whether the first SAS expander has reserved physical links for transmitting data to an other second SAS expander when the reserved physical links of the first SAS expander are not in the unused state;
determining whether the data flow of the reserved physical links of the other second SAS expander is less than a default value when the first SAS expander has reserved physical links for transmitting data to the other second SAS expander;
determining that the first SAS expander has no reserved physical links that can be adjusted when the first SAS expander has no reserved physical links for transmitting data to the other second SAS expander, or the data flow of the reserved physical links of the other second SAS expander is not less than the default value; and
determining that the first SAS expander has reserved physical links that can be adjusted when the reserved physical links of the first SAS expander are in the unused state, or the data flow of the reserved physical links of the other second SAS expander is less than the default value.

16. The non-transitory storage medium according to claim 13, wherein step (c) comprises:
obtaining configuration parameters of the adjusted physical link from the firmware of the first SAS expander;
obtaining address information of the adjusted physical link from the configuration parameters; and
setting the address information as an address of a SAS port of the second SAS expander.

17. The non-transitory storage medium according to claim 13, wherein the diverter switch has different connectivity options, and each of the connectivity options adjusts a connectivity of the adjusted physical link according to the control signal.

18. The non-transitory storage medium according to claim 17, wherein the method further comprises:
allocating the adjusted physical link to the second SAS expander using each of the different connectivity options.

* * * * *